June 15, 1954  M. AUPHAN  2,681,423
LIGHT REFLECTING SCREEN FOR CATHODE-RAY TUBES
Filed July 28, 1950  2 Sheets-Sheet 1

Inventor:
Midd Auphan

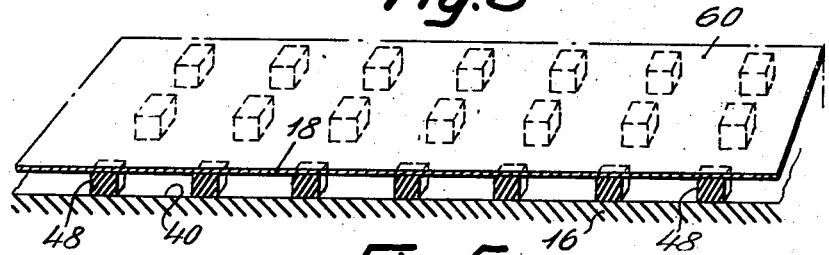
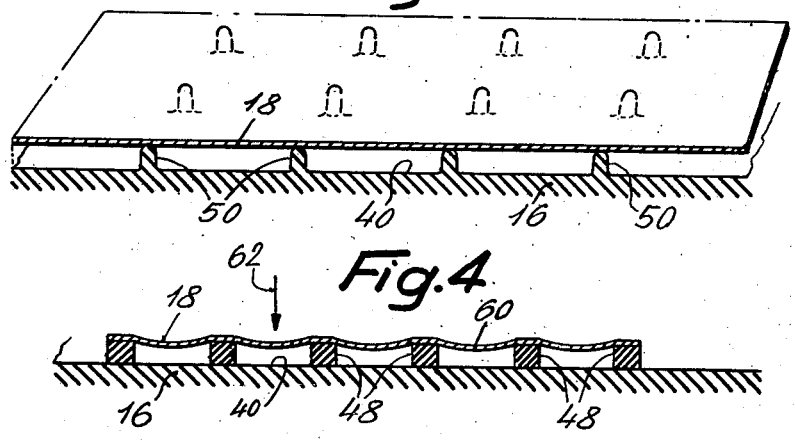
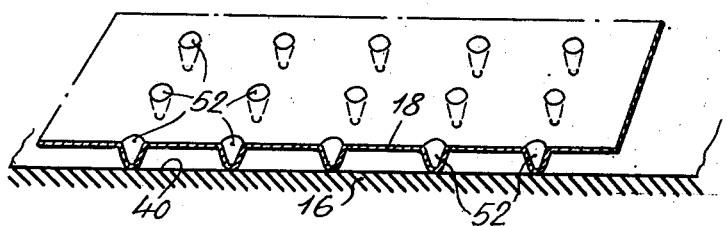
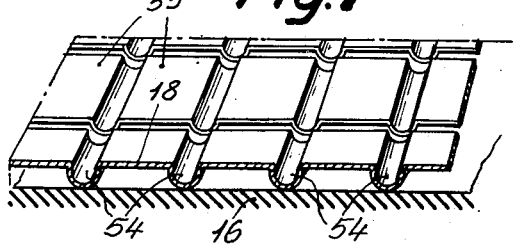

Patented June 15, 1954

2,681,423

UNITED STATES PATENT OFFICE 2,681,423

LIGHT REFLECTING SCREEN FOR CATHODE-RAY TUBES

Michel Auphan, Paris, France, assignor to Societe Generale d'Electronique, Monaco, Principality of Monaco Application July 28, 1950, Serial No. 176,355

Claims priority, application France June 9, 1949

30 Claims. (Cl. 315—3)

The present invention relates to a light reflecting screen for cathode ray tubes, and more particularly to a deformable light reflecting screen. Furthermore the present invention relates to a cathode ray tube and a television receiver comprising such a screen.

It is an object of the present invention to use the electrostatic forces caused by secondary emission from the screen.

It is another object of the present invention to provide a light reflecting screen consisting of strips which are not insulated from one another.

It is a further object of the present invention to provide a screen which is free of the so-called "iconoscope stain" which has the effect to render the portion of the image where the scanning starts more brilliant than the portion where it ends; or the contrary.

It is still another object of the present invention to arrange the screen in such a manner that the electronic beam traverses the metal sheet forming part of the screen.

A light reflecting screen for cathode ray tubes according to the present invention comprises in combination, an insulating body having a plane surface, a conductive sheet arranged substantially parallel to, and spaced apart from the plane surface of the insulating body, and means connecting the conductive sheet to the insulating body so as to permit the conductive sheet to assume locally a non-parallel position with respect to the insulating body under the action of cathode rays impinging upon the conductive sheet.

According to an embodiment of the present invention the metal sheet is composed of a plurality of strips, tongues or facets spaced apart from one another by substantially equal distances. The said strips have preferably marginal portions connecting the same to the insulating body.

According to another embodiment of the present invention distance pieces are spaced apart from one another and connect the metal sheet to the insulating body so as to permit at least portions of the metal sheet to assume locally non-parallel positions with respect to the insulating body.

In one embodiment of the present invention the distance pieces are shaped as rods arranged substantially perpendicular to the plane surface between the insulating body and the metal sheet.

According to another embodiment of the present invention the distance pieces are integral with the insulating body and preferably shaped as fingers arranged substantially perpendicular to the plane surface.

According to a further embodiment of the present invention the distance pieces are shaped as substantially parallel identations of the metal sheet.

According to a further embodiment of the present invention the metal sheet is provided with slots or cuts or perforations spaced apart from one another, distance pieces connecting said sheet to the insulating body being provided, as hereinbefore.

According to such an embodiment of the present invention the metal sheet is composed of a plurality of parallel strips or ribbons with distance pieces preferably shaped as corrugations of such ribbons to connect said sheet to said insulating body.

In a preferred embodiment of the present invention the metal sheet has a thickness of 100 to 3000 A. and is spaced apart by about 1 micron from the plane surface of the insulating body.

According to another embodiment of the present invention the metal sheet and the insulating body are transparent.

A cathode ray tube according to the present invention comprises in combination, a screen including an insulating body having a plane surface facing the interior of the tube, a conductive sheet arranged substantially parallel to, and spaced apart from the plane surface of the insulating body, and means connecting the conductive sheet to the insulating body so as to permit the conductive sheet to assume a non-parallel position with respect to the insulating body under the action of cathode rays impinging upon the conductive sheet; means for admitting a beam of light to the interior of the tube so as to be reflected by the conductive sheet; and means allowing the light rays reflected by the conductive sheet to leave the interior of the tube.

A television receiver according to the present invention comprises in combination, a light reflecting screen having portions having light reflecting faces on one side of the screen and being adapted for the light reflection thereof being varied by an electron beam impinging upon the light reflecting faces, means for emitting an electron beam impinging on the light reflecting faces of the screen portions, means for modulating the intensity of the electron beam and moving the same along the screen portions, a light source emitting a light beam impinging upon the light reflecting faces of the screen portions so as to be reflected by same, and optical lens means collecting the reflected light beam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a diagrammatic view of part of another embodiment of a screen in normal position;

Fig. 4 is a cross-section of the screen shown in Fig. 3 in the position which it assumes under the influence of an impinging electron beam;

Fig. 5 is a diagrammatic view of part of a further embodiment of a screen;

Fig. 6 is a diagrammatic view of still part of another embodiment of the screen;

Fig. 7 is a diagrammatic view of still part of another embodiment of the screen.

Figure 1:
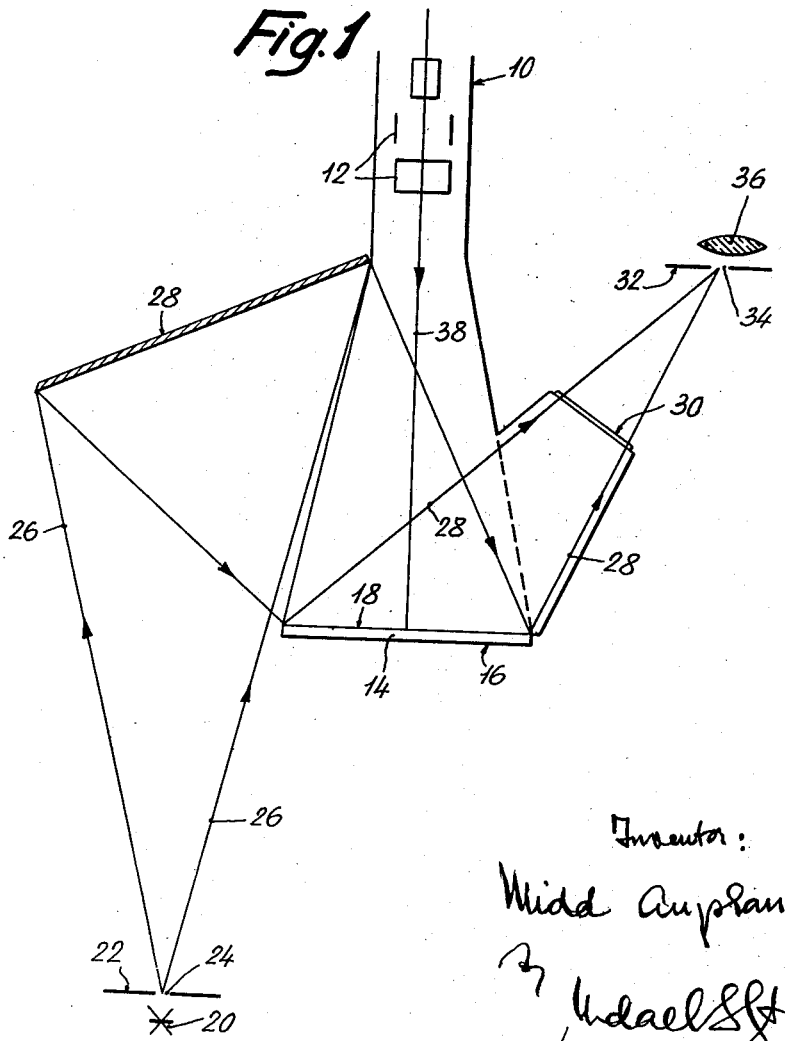
Fig. 1 is a diagram of a television receiver according to the present invention having a cathode ray tube with a reflecting screen.

All the cross-sections shown in Figs. 2 to 7 are at an enlarged scale in comparison to Fig. 1.

Referring now to the drawings and first to Fig. 1, means are shown for emitting an electron beam, these means comprising a cathode ray tube 10 provided with conventional means 12 for modulating the intensity of the electron beam and moving the same along the scanning lines. The cathode ray tube is provided at the larger end thereof with a light reflecting screen 14 which will be described more fully in detail hereinafter. The screen includes an insulating body 16 of transparent or opaque material and a thin conductive sheet 18 preferably consisting of metal and facing the interior of the tube 10. The conductive sheet 18 is arranged substantially parallel to and spaced apart from the plane surface of the insulating body 16, the thickness of the metal sheet being between 100 and 3000 Angstrom units and the distance thereof from the insulating body being about 1 micron. A source of light 20 provided with a diaphragm 22 having a slot 24 emits a beam of light 26 which is reflected by a mirror 28 to the light reflecting metal sheet 18 of the screen 14 which reflects the same inside the tube 10 which is provided with an outlet for the reflected light rays 28 carrying a transparent slab 30 which is preferably carefully polished and optically well defined for instance by having parallel faces. The reflected rays 28 continue their path outside the tube 10 and impinge upon a diaphragm 32 provided with a slot 34 arranged in the position of the image of slot 24 which is produced by the mirror 28 and the screen 14 when the latter is impinged upon by a beam of electrons produced in the cathode ray tube 10. A lens system 36 arranged behind the diaphragm 32 and the slot 34 collects the reflected light beams and throws them on a screen (not shown).

The operation of this device is as follows:

The light emitted by the source 20 is reflected by the mirror 28 toward the screen 14 by which it is again reflected toward the diaphragm 32. As long as the portions of the light reflecting metal sheet 18 are not impinged upon by the beam 38 of electrons they reflect the light rays in such a manner that no light passes through the slot 34 of the diaphragm 32 so that no light is collected by the lens system 36 and thrown on the screen (not shown). When, however, portions of the metal sheet 18 are impinged by a beam of electrons 38 they assume locally a different position which allows the reflected light rays 28 to pass through the slot 34 so that they are collected by the lens system 36 and thrown on the screen (not shown).

Referring now to Figs. 2 to 6 of the drawings, showing several embodiments of the screen 14 of Fig. 1, said screen comprises an insulating body 16 having a plane surface 40 and a thin metal sheet 18 having a thickness between 100 and 3000 Angstron units. The vertical distance between the metal sheet 18 and the plane surface 40 of the insulating body 16 amounts preferably to 1 micron.

Figure 2:
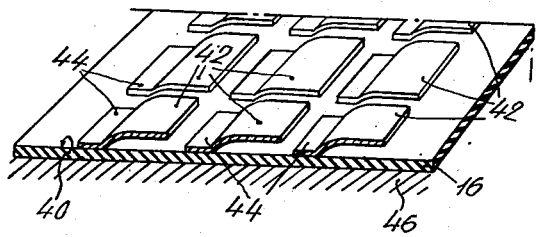
Fig. 2 is a diagrammatic view of part of an embodiment of a screen forming part of the cathode ray tube shown in Fig. 1.

In the embodiment shown in Fig. 2 the metal sheet consists of a plurality of substantially square strips or "tongues" 42 spaced apart from one another. The tongues 42 are substantially parallel to one another and to the plane surface 40 of the insulating body 16 to which they are connected by marginal portions 44 which are offset with respect to the main portions of the strips 42, respectively. The insulating body 16 is arranged according to the embodiment shown in Fig. 2 on a metal support 46 which, however, can be omitted.

In the embodiment shown in Figs. 3 to 6, the metal sheet 18 is made in one piece and connected according to the embodiment shown in Figs. 3 and 4 to the insulating body 16 by distance pieces such as rods 48 being preferably arranged parallel to, and at equal distances from, one another, and substantially perpendicular to the sheet 18.

In the embodiment shown in Fig. 5 the distance pieces are shaped as fingers 50 which are integral with the insulating body 16.

In the embodiment shown in Fig. 6 the distance pieces are shaped as substantially parallel indentations 52 of the metal sheet 18.

In the embodiment shown in Fig. 7 the metal sheet is composed of a plurality of parallel ribbons or "strips" 53, said strips being provided with corrugations or pleats 54, connecting same from place to place to the insulating body 16 (or with any of the connecting means of Figs. 3 to 6).

The operation of the screens shown in Figs. 2 to 6 is substantially the same and will be explained with references to Figs. 3 and 4. The sheet 18 is subdivided by the distance pieces 48, 50 or 52 into facet like portions such as 60 in Fig. 3 whereas in Fig. 2 the sheet consists of separate facets 42. As long as no cathode ray impinges on a portion of the metal sheet 18 the portion (60 according to Figs. 3 and 4, or 42 according to Fig. 2) has a parallel position to the plane surface 40 of the insulating body 16 so that it reflects the light impinging on it as more fully described hereinbefore in connection with Fig. 1. When a cathode ray 62 impinges on a portion 60 as shown in Fig. 4 the latter is displaced from its parallel position shown in Fig. 3 and assumes a deflected position shown in Fig. 4 in which any light rays impinging on the reflecting surface of the portion 60 are reflected toward the slot 34 shown in Fig. 1.

It should be understood that the metal sheet 18 is connected to a source of high potential (not shown) with respect to the cathode of the cathode ray tube 10. The electrons forming the electron beams 62 traverse the metal sheet 18 if their velocity determined by the anode potential of the tube 10 is sufficiently high. If the potential is in the neighborhood of the critical value at which the velocity of the electrons emitted by the metal sheet 18 is on an average zero, the electrons leaving the metal sheet 18 are very slow and are caught by the insulating body 16. In consequence thereof at the point of impact of an electron beam the negative electric charge of the metal sheet 18 is as it were transferred to the insulating body 16 which obtains in this way a negative charge with respect to the metal sheet 18 so that an electrostatic force of attraction between the insulating body 16 and the metal sheet 18 arises which has the effect of curving the portions 60 and approaching them to the insulating body 16 whereas the parts of the metal sheet 18 being in contact with the distance pieces 48 remain at their initial distance from the insulating body.

The metal sheet 18 may be, if desired, deposited on a layer of collodium or plastic material in order to reduce its thickness and its mechanical strength.

The metal sheet 18 need not be continuous but may be provided with holes, slots or cuts or may consist of tongues such as shown in Fig. 2, or of strips, as shown in Fig. 7.

The number of distance pieces is preferably larger, in more than one direction, than the number of lines of the television image. The distance between the distance pieces is preferably smaller than the distance of these lines.

The material of the insulating body 16 has preferably a resistivity allowing the body 16 to be discharged during the formation of one image.

It will be understood that each of the elements described above, or two or more together, may also find a useful application in other types of light reflecting screens for cathode ray tubes differing from the types described above.

While I have illustrated and described the invention as embodied in a television receiver, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A deformable light reflecting screen for cathode ray tubes, comprising in combination, an insulating body having a plane surface; an electrically conductive sheet arranged substantially parallel to, and spaced apart from, said plane surface of said insulating body; and means connecting said electrically conductive sheet to said insulating body so as to permit said electrically conductive sheet to assume locally a non-parallel position with respect to said insulating body under the action of cathode rays impinging upon said electrically conductive sheet.

2. A deformable light reflecting screen for cathode ray tubes, comprising in combination, an insulating body having a plane surface; a plurality of electrically conductive tongues arranged substantially parallel to, and spaced apart by substantially equal distances from, said plane surface of said insulating body; and means connecting said electrically conductive tongues to said insulating body so as to permit said electrically conductive tongues to assume non-parallel positions with respect to said insulating body under the action of cathode rays impinging upon said electrically conductive tongues.

3. A deformable light reflecting screen for cathode ray tubes, comprising in combination, an insulating body having a plane surface; a plurality of electrically conductive tongues arranged substantially parallel to, and spaced apart by substantially equal distances from, said plane surface of said insulating body; and marginal portions forming part of said tongues and connecting said electrically conductive tongues to said insulating body so as to permit said electrically conductive tongues to assume non-parallel positions with respect to said insulating body under the action of cathode rays impinging upon said electrically conductive tongues.

4. A deformable light reflecting screen for cathode ray tubes, comprising in combination, an insulating body having a plane surface; a plurality of spaced electrically conductive tongues arranged substantially parallel to, and spaced apart by substantially equal distances from, said plane surface of said insulating body; and marginal portions forming part of said tongues and connecting said electrically conductive tongues to said insulating body so as to permit said electrically conductive tongues to assume non-parallel positions with respect to said insulating body under the action of cathode rays impinging upon said electrically conductive tongues.

5. A deformable light reflecting screen for cathode ray tubes, comprising in combination, an insulating body having a plane surface; an electrically conductive sheet arranged substantially parallel to, and spaced apart from, said plane surface of said insulating body; and distance pieces being spaced apart from one another and connecting said electrically conductive sheet to said insulating body so as to permit said electrically conductive sheet to assume locally non-parallel positions with respect to said insulating body under the action of cathode rays impinging upon said electrically conductive sheet.

6. A deformable light reflecting screen for cathode ray tubes, comprising in combination, an insulating body having a plane surface; an electrically conductive sheet arranged substantially parallel to, and spaced apart from, said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet, said distance pieces being shaped as rods arranged between said insulating body and said electrically conductive sheet.

7. A deformable light reflecting screen for cathode ray tubes, comprising in combination, an insulating body having a plane surface; an electrically conductive sheet arranged substantially parallel to, and spaced apart from, said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet, said distance pieces being integral with said insulating body.

8. A deformable light reflecting screen for cathode ray tubes, comprising in combination, an insulating body having a plane surface; an electrically conductive sheet arranged substantially parallel to, and spaced apart from, said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet, said distance pieces being shaped as fingers arranged parallel with one another and being integral with said insulating body.

9. A deformable light reflecting screen for cathode ray tubes, comprising in combination, an insulating body having a plane surface; an electrically conductive sheet arranged substantially parallel to, and spaced apart from, said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet, said distance pieces being shaped as substantially parallel indentations of said electrically conductive sheet.

10. A deformable light reflecting screen for cathode ray tubes, comprising in combination, an insulating body having a plane surface; a plurality of electrically conductive strips arranged substantially parallel to, and spaced apart by substantially equal distances from, said plane surface of said insulating body; and means connecting said electrically conductive strips to said insulating body so as to permit said electrically conductive strips to assume non-parallel positions with respect to said insulating body under the action of cathode rays impinging upon said electrically conductive strips.

11. A deformable light reflecting screen for cathode ray tubes, comprising in combination, an insulating body having a plane surface; a plurality of electrically conductive strips arranged substantially parallel to, and spaced apart by substantially equal distances from, said plane surface of said insulating body; and distances pieces being spaced apart from one another and connecting said strips to said insulating body so as to permit at least portions of said strips to assume non parallel positions with respect to said insulating body under the action of cathode rays impinging upon said electrically conductive strips.

12. A deformable light reflecting screen for cathode ray tubes, comprising in combination, an insulating body having a plane surface; a plurality of electrically conductive strips arranged substantially parallel to, and spaced apart by substantially equal distances from, said plane surface of said insulating body; and distances pieces being spaced apart from one another and connecting said strips to said insulating body so as to permit at least portions of said strips to assume non parallel positions with respect to said insulating body under the action of cathode rays impinging upon said electrically conductive strips said distance pieces being shaped as corrugations of said strips.

13. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from, said plane surface of said insulating body; and means connecting said electrically conductive sheet to said insulating body so as to permit said electrically conductive sheet to assume locally a non-parallel position with respect to said insulating body under the action of cathode rays impinging upon said electrically conductive sheet.

14. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet.

15. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from, said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet, said distance pieces being shaped as rods arranged parallel with one another between said insulating body and said electrically conductive sheet.

16. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet, said distance pieces being integral with said insulating body.

17. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet, said distance pieces being shaped as fingers arranged parallel with one another and being integral with said insulating body.

18. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from, said plane surface of said insulating body; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet, said distance pieces being shaped as substantially parallel indentations of said electrically conductive sheet.

19. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from, said plane surface of said insulating body, said sheet being in the form of substantially parallel strips; and means connecting said electrically conductive sheet to said insulating body so as to permit said electrically conductive sheet to assume locally a non-parallel position with respect to said insulating body under the action of cathode rays impinging upon said electrically conductive sheet.

20. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from, said plane surface of said insulating body; said sheet being in the form of substantially parallel strips; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet.

21. A deformable light reflecting screen for cathode ray tubes, comprising in combination, an insulating body having a plane surface; an electrically conductive sheet having a thickness of 100 to 3000 A. and being arranged substantially parallel to, and spaced apart by about 1 micron from, said plane surface of said insulating body; said sheet being in the form of substantially parallel strips; and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet; said distance pieces being shaped as corrugations of said strips.

22. A deformable light reflecting screen according to claim 1 in which said metal sheet and said insulating body are both made of transparent material.

23. A cathode ray tube comprising in combination, a screen including an insulating body having a plane surface facing the interior of the tube, an electrically conductive sheet arranged substantially parallel to, and spaced apart from said plane surface of said insulating body, and means connecting said electrically conductive sheet to said insulating body so as to permit said electrically conductive sheet to assume locally a non-parallel position with respect to said insulating body under the action of cathode rays impinging upon said electrically conductive sheet; means for admitting a beam of light to the interior of the tube so as to be reflected by said electrically conductive sheet; and means allowing the light rays reflected by said electrically conductive sheet to leave the interior of the tube.

24. A cathode ray tube as claimed in claim 23 in which the anode potential of the tube is just high enough for the metal sheet to be traversed, the velocity of the electrons emitted by such metal sheet being substantially zero on an average.

25. A cathode ray tube comprising in combination, a screen including an insulating body having a plane surface facing the interior of the tube, an electrically conductive sheet having a thickness of 100 to 3000 A. and being arranged substantially parallel to, and spaced apart by about 1 micron from, said plane surface of said insulating body, and means connecting said electrically conductive sheet to said insulating body so as to permit said electrically conductive sheet to assume locally a non-parallel position with respect to said insulating body under the action of cathode rays impinging upon said electrically conductive sheet; means for admitting a beam of light to the interior of the tube so as to be reflected by said electrically conductive sheet; and means allowing the light rays reflected by said electrically conductive sheet to leave the interior of the tube.

26. A cathode ray tube comprising in combination, a screen including an insulating body having a plane surface facing the interior of the tube, an electrically conductive sheet having a thickness of 100 to 3000 A. and being arranged substantially parallel to, and spaced apart by about 1 micron from, said plane surface of said insulating body, and distance pieces being spaced apart from one another and connecting said electrically conductive sheet to said insulating body so as to permit at least portions of said electrically conductive sheet to assume non-parallel positions with respect to said insulating body under the action of cathode rays impinging upon said electrically conductive sheet; means for admitting a beam of light to the interior of the tube so as to be reflected by said electrically conductive sheet; and means allowing the light rays reflected by said electrically conductive sheet to leave the interior of the tube.

27. A cathode ray tube as in claim 26 in which the thickness of the insulating body and its resistivity are such that it may be discharged during the formation of one image.

28. A cathode ray tube as in claim 26 in which the number of distance pieces is larger than the number of scanning lines in more than one direction.

29. A cathode ray tube as in claim 28 in which the thickness of the insulating body and its resistivity are such that it may be discharged during the formation of one image.

30. A deformable light reflecting screen for cathode ray tubes, comprising in combination, an insulating body having a plane surface; electrically conductive substantially plane means arranged substantially parallel to, and spaced apart from, said plane surface of said insulating body; and means connecting said electrically conductive means to said insulating body so as to permit said electrically conductive means to assume locally a non-parallel position with respect to said insulating body under the action of cathode rays impinging upon said electrically conductive means.

References Cited in the file of this patent

UNITED STATES PATENTS

| Number | Name | Date |
|---|---|---|
| 2,025,143 | Zworykin | Dec. 24, 1935 |
| 2,128,631 | Eaton | Aug. 30, 1938 |
| 2,182,451 | Ploke | Dec. 5, 1939 |
| 2,238,137 | Strubig et al. | Apr. 15, 1941 |
| 2,281,280 | Gabor | Apr. 28, 1942 |
| 2,415,226 | Sziklai | Feb. 4, 1947 |
| 2,457,981 | De Forest | Jan. 4, 1949 |
| 2,471,409 | Busignies | May 31, 1949 |